March 20, 1934. C. G. HERBST 1,952,027
ELECTRIC SYSTEM FOR TOY VEHICLES
Filed June 29, 1933
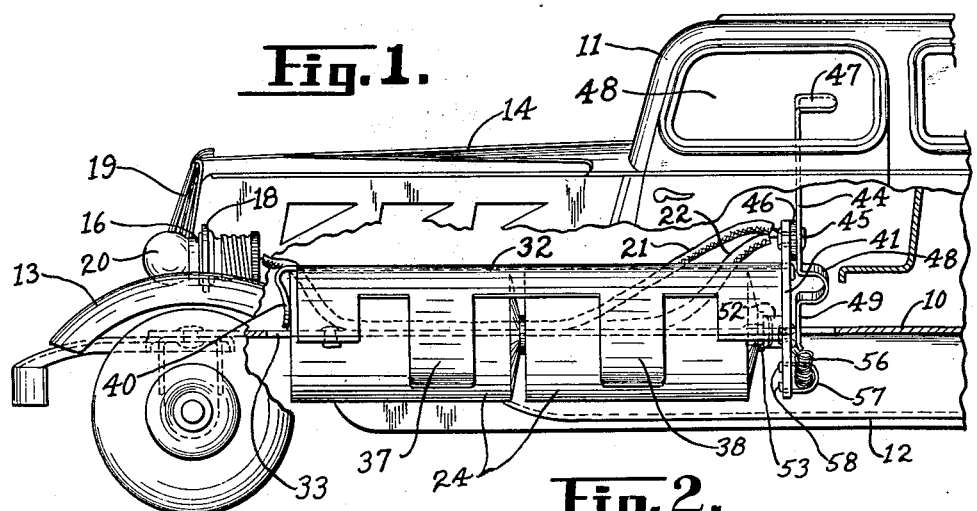
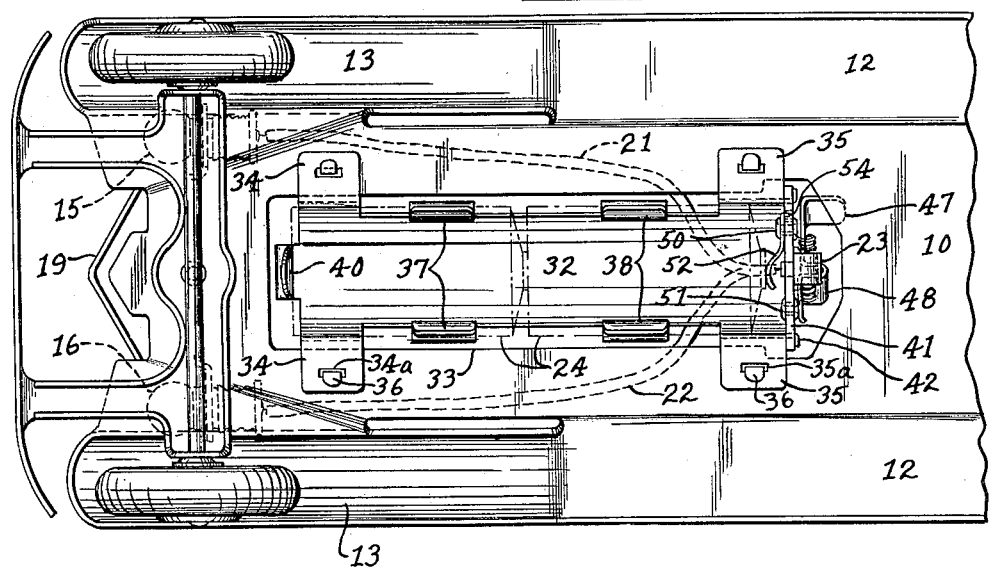
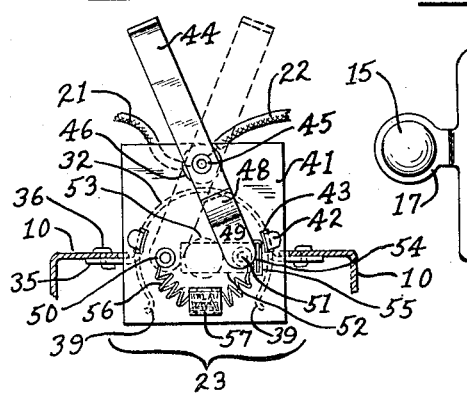
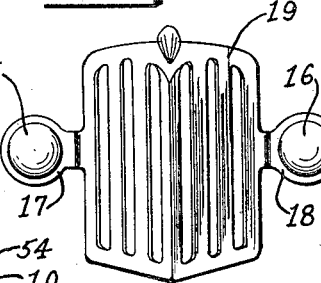
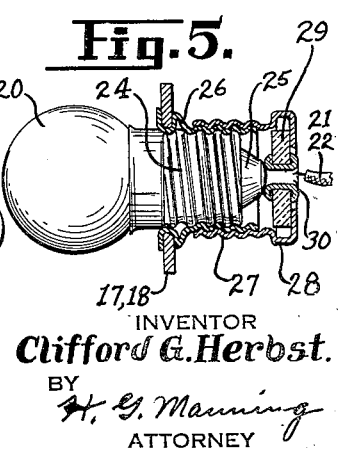
INVENTOR
Clifford G. Herbst.
BY
H. G. Manning
ATTORNEY Patented Mar. 20, 1934

1,952,027

UNITED STATES PATENT OFFICE 1,952,027

ELECTRIC SYSTEM FOR TOY VEHICLES

Clifford G. Herbst, Waterbury, Conn., assignor to Hoge Manufacturing Company, Inc., New York, N. Y., a corporation of New York Application June 29, 1933, Serial No. 678,212

9 Claims. (Cl. 46—48)

This invention relates to toy vehicles such as automobiles, locomotives, track toys, and the like and more particularly to toys of this class which at optionally controllable periods in their use draw upon either the full available current or a reduced current, or no current at all, as, for example, in the case of toys provided with an electrically operated head light lamp arranged to show at will either a bright or a dim light or no light.

The principal object of this invention is to provide a simple, practical, reliable, durable, compact, easily installable and manipulatable, inexpensive, electric system for toys of the class referred to capable of being selectively operated, as stated, to supply either all or a predetermined portion of or none of the electric energy generated at a constant potential source to the electrically operated unit whereby the operation of the latter may be optionally controlled.

For purposes of convenience of description and disclosure the invention will be illustrated and described primarily with relation to a lighting system for toys of the class referred to wherein the same includes switch mechanism which may be selectively operated to produce either bright, dim, or no illumination of the headlight lamps. In this particular application of the invention one object is to provide a battery-operated lighting system for toys of the above mentioned nature in which the battery supporting member and the switch mechanism are adapted to be detachably secured to the chassis as a unit.

With these and other objects in view, there has been illustrated on the accompanying drawing, one form in which the invention may be conveniently embodied in practice.

In the drawing:

Fig. 1 represents a fragmentary side elevation of a toy automobile with parts broken away to show the interior battery supporting member and switch unit.

Fig. 2 is a bottom plan view of the same.

Fig. 3 is a right-hand face view of the switch unit.

Fig. 4 is a front elevation of the automobile radiator grille and integral headlight brackets.

Fig. 5 is a longitudinal sectional view through one of the headlight lamp sockets.

Referring now to the drawing in which like reference numerals denote corresponding parts throughout the several views, the numeral 10 indicates the chassis of a toy automobile having a body 11, which is equipped with the usual form of running boards 12, fenders 13, and hood 14.

A pair of headlight members 15 and 16 are suitably mounted on the toy body and attached to the front of the automobile by means of a pair of lateral apertured lamp supporting brackets 17 and 18 formed integral with an ornamental grille 19 disposed in front of the radiator section of the hood 14. A pair of miniature light bulbs 20 are threadedly engaged in the headlight members 15 and 16, and are adapted to receive electrical energy through a pair of insulated conductor wires 21 and 22 under the control of a switch mechanism 23, which serves to complete the circuit through a pair of small cylindrical dry cells 24 encased as is usual in such cells, with an insulating cylindrical cover and supported in axial alinement with each other underneath the hood 14. The toy itself is constructed of metal and is used as a ground for current which makes its circuit through the battery cells 24, the switch mechanism 23 (when in a current-closing position), the wires 21 and 22, and the lamp sockets, all of these elements being connected in series, one terminal of the bulbs 20 being in each case grounded on the toy body.

The specific construction of one of the headlight members 15, 16, is clearly illustrated in Fig. 5, wherein is shown the lamp bulb 20 having the usual form of threaded shell 24 and central contact projection 25. The bulb 20 is adapted to be threadedly engaged in a screw shell socket 26. The screw shell 26 is provided with an annular shoulder or flange adjacent the front end thereof which overlies a portion of the rear face of the lateral bracket supporting such shell, the front end of said screw shell 26 being crimped or spun around the aperture provided in said bracket so that the latter is firmly clamped between said shoulder and said crimped end of the screw shell 26, thus affording a permanent mounting for the socket.

The screw shell 26 is open at both ends and the rear end thereof is adapted to be closed by a threaded cap 27 having a knurled expanded hollow head 28 integrally formed at its rear end for providing a gripping means to facilitate the manual assembly or removal thereof. An insulating washer 29 is loosely disposed within the hollow head 28, and said washer is provided with a central terminal in the form of a tubular metal eyelet 30, the inner end of which is adapted to engage the center contact 25 on the bulb 20. The diameter of the insulating washer 29 is slightly greater than the inner diameter of the screw shell 26 so that when the bulb 20 is not screwed in position in said screw shell, the washer is retained in the threaded cap 27 by the inner end of said screw shell. The eyelet 30 is insulated from the socket shell 26, and the conductor wires 21, 22, are electrically joined to said eyelet, as by soldering.

In order to provide a detachable holding means for securing the batteries to the chassis 10, provision is made of an elongated supporting bracket or battery holder 32 positioned in a substantially rectangular slot 33 in the chassis 10. The body of the bracket 32 is made cylindrical to conform to the shape of the batteries 24, and the opposite ends of said bracket 32 are formed with two pairs of outwardly extending lugs 34 and 35, which are adapted to engage the underside of the chassis 10 and are held in a secure position by means of locking tabs 36 secured to said chassis and passed down through two pairs of rectangular slots 34a and 35a formed in the lugs 34 and 35 (see Fig. 2). The batteries 24 are detachably supported in two pairs of resilient clips 37 and 38 depending from the horizontal edges of the bracket 32, the lower extremities of said clips being outwardly curved at 39, as best shown in Fig. 3, to facilitate the insertion of the batteries 24.

The batteries 24 are held against forward longitudinal movement by means of an S-shaped lug 40 formed integral with the front edge of the bracket 32, and said lug 40 is adapted to engage against the zinc bottom of the left-hand battery 24, as viewed in Fig. 1, for connecting the negative terminal of the batteries to the chassis 10 which serves as a "ground".

The switch mechanism 23, previously referred to, is preferably secured to the rear edge of the bracket 32 as a unit, and comprises a thin, vertically arranged rectangular member 41 consisting of a single piece of insulating material which is secured to the rear end of said bracket 32 by means of a plurality of small lugs 42, passing through the slots 43 in said member 41, and crimped against the face thereof. A switch lever 44 is pivoted at the upper end of the member 41 by means of an eyelet rivet 45 and is spaced therefrom by means of an insulating spacing washer 46 (see Fig. 1). The insulating member 41, even when constituted of indurated fibre board, possesses sufficient inherent strength to permit the eyelet rivet 45 and the lever 44 which is pivoted thereon to be reliably supported and similarly to be in turn itself reliably supported upon the rear end of the bracket 32 by the bent-over lugs 42. The member 41 also carries and supports the stationary contactor eyelets 50 and 51 which by means of their eyelet formation are stationarily secured in spaced relationship in said member 41 and, in said relationship, permanently position and maintain the rheostat coil or resistor 56 upon the member 41. (See Fig. 3.) The switch lever 44 extends upwardly into the body 11 of the toy automobile, and is provided at its upper end with a rearwardly extending horizontal handle member 47, which is readily accessible through the window openings 48 in the body 11 of the vehicle. The lever 44 below the fulcrum 45 is constituted of conducting material conductively connecting either of the contacts or eyelets 50 and 51 (when in contact therewith) with the lamp wires 21 and 22 and is preferably formed with a U-shaped loop 48 for the purpose of rendering the lower contacting portion 49 of the lever 44 more resilient and to assure a firm contact of the same against the contactor eyelets 50 and 51.

A horizontal resilient conductor strip 52 is secured to the front face of the block 41 by means of the right-hand terminal eyelet 51, as viewed in Fig. 3. The free end of said strip 52 is outwardly bowed, as best seen in Fig. 2, and is adapted to lie in direct contact with the carbon or positive terminal 53 of the adjacent battery 24. The fixed end of the conductor strip 52 is formed rearwardly into an angular lug 54, which is adapted to project into a slot 55 in the block 54 for the purpose of preventing said strip 52 from being rotatively displaced about its anchorage point.

In order to provide both "dim" and "bright" lights for the toy automobile, provision is made of a small rheostat coil or resistor 56 connecting the right-hand terminal eyelet 51 with the left-hand terminal eyelet 50, as viewed in Fig. 3. The coil 56 is held in a downwardly bowed position against the front face of the block 41 by means of the eyelets 50 and 51. A U-shaped clip 57, held in place by having its extremities 58 projecting through slots in said block 41 and bent thereupon prevents undesired vibration, rattling, or displacement of the resistor 56 during winding up or progression of the toy over the ground or on its track but, being of small dimensions, does not interfere with the proper functioning of the resistor even though the resistor may be constructed of bare wire and the clip 57 be also made of conducting material. Both of the conductor wires 21 and 22 are joined to the pivoted eyelet rivet 45 of the switch handle 47 so that the electric circuits from the switch unit 23 to both headlights 15 and 16 will be simultaneously opened and closed.

*Operation*

In the operation of the lighting system, assuming the switch lever 44 is in its normal vertical "off" position, when it is desired to turn the headlights 15 and 16 to "bright", it will only be necessary to reach through the window 48 and pull the top of the handle 47 toward the left side of the car until the lower end of the lever 44 contacts with the right-hand terminal eyelet 51 of the switch 23, as shown in full lines in Fig. 3. To switch the headlights 15 and 16 to "dim", it will only be necessary to swing the lever in the opposite direction to the dotted line position, as shown in Fig. 3, causing the lower end of the lever 44 to contact with the left-hand terminal eyelet 50, the rheostat coil 56 being thus included in the circuit.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. For example, the switch mechanism may be used with toy vehicles which have other sources of electric energy than batteries or in which the switch mechanism controls other means of current consumption than lamp bulbs, as, for instance, where the electrically operated unit in the toy is an electrically responsive means arranged to propel or drive the toy optionally at low speed, medium speed, or high speed. In each case the switch mechanism will be constructed to operate in the same general way, i. e., to permit the operator at will to set the switch for use of full available power, reduced power, or entirely off. In short, the invention includes all the modifications and embodiments coming within the scope of the following claims.

Having thus fully described the invention, what is claimed as new, and for which it is desired to secure Letters Patent, is:

1. In a toy vehicle, a chassis member having an aperture therein, a body member superimposed on said chassis, a pair of headlight brackets attached to the front of said body, a pair of light bulbs detachably secured in said brackets, a battery supporting bracket positioned in said aperture and secured to the underside of said chassis, a transverse insulating block attached to one end of said supporting bracket, an electric switch unit mounted on said block and having an operating lever projecting up into said body member, a pair of contacts on said block selectively engageable by the lower end of said lever, a resistance element connecting said contacts, means on said bracket for detachably and resiliently embracing a battery cell, means on said bracket to limit the forward longitudinal movement of said cell in said bracket and grounding the same to said chassis, and means for electrically connecting said light bulb terminal with said switch unit and said chassis.

2. In a toy vehicle, a chassis member having a body mounted thereon, a pair of headlight bulb sockets attached to the forward end of said body and grounded to said chassis, a battery supporting bracket having resilient clip members for detachably embracing a battery cell, a switch affixed to the rear end of said bracket and insulated therefrom, means for attaching said bracket and switch as a unit to the chassis, said bracket having a resilient finger at its forward end for engaging the front terminal of said cell for grounding the same to the chassis, said switch comprising a lever having its upper end projecting into said body and operable therefrom, and a pair of conductor cables connecting the center terminals of said bulbs with said switch, said switch having two contacts connected together by a resistance element, said contacts lying in the path of the lower end of said lever so that the circuit through the headlight bulb may be selectively completed through either contact to produce either a dim or a bright light.

3. In a toy vehicle, a chassis member having a body mounted thereon, a pair of headlight bulb sockets attached to the forward end of said body and grounded to said chassis, a battery supporting bracket having resilient clip members for detachably embracing a battery cell, a switch affixed to the rear end of said bracket and insulated therefrom, means for attaching said bracket and switch as a unit to the chassis, said bracket having a resilient finger at its forward end for engaging the front terminal of said cell for grounding the same to the chassis, said switch comprising a transverse insulating block secured across the end of said bracket, a lever switch pivotally connected to said block and having its upper end within said body member, a pair of terminal buttons on said block selectively engageable by the lower end of said lever, a resistance element connecting said buttons, one of said buttons having electrical connection with the positive terminal of said battery, and means for electrically connecting said lever with one terminal of each of said headlight bulbs.

4. The combination of a toy vehicle having a metallic body, an electrically operated unit mounted on the body thereof and having one terminal grounded thereon, a source of electrical energy, switch mechanism selectively operable to supply either all, or a predetermined portion of, or none of the electrical energy from said source to said electrically operated unit, said switch mechanism comprising a thin insulating member, metallic contacts anchored in said member in fixed spaced relation, one of said contacts being arranged in coordination with the switch mechanism and the source of energy to permit the passage of the entire available electrical energy to said electrically operated unit when the switch mechanism is selectively operated to the full power consumption position, a resistance element connecting said contacts and anchored on and positioned upon said member by said metallic contacts and adapted to become a part of the electric circuit through the other of said contacts when the switch mechanism is selectively operated to supply only the predetermined portion of the electric energy to said electrically operated unit, and means electrically connecting the source of electrical energy, the toy body, the switch mechanism, and the electrically operated unit in series.

5. An electrically operated toy vehicle comprising a metallic toy body, a battery holder and battery, the battery save for its terminals being insulated from the metallic toy body and the conducting parts of the battery circuit, an electric light bulb mounted on the toy body and having one terminal grounded thereon, switch mechanism optionally movable to one of three positions for providing bright, dim, or no illumination from the bulb, said switch mechanism including a single piece of insulation supporting spaced metallic contacts connected by a small resistor, one at least of said contacts being in electrical connection with one terminal of the battery and said electric light bulb, while current is being supplied to the latter to permit either the entire available current from said battery or only a portion thereof to reach said bulb depending upon whether the switch mechanism is positioned for bright or for dim illumination of the bulb, and means electrically connecting the battery, the toy body, the switch mechanism and the bulb in series.

6. An electrically operated toy vehicle comprising a metallic toy body, a battery holder and battery, the battery save for its terminals being insulated from the metallic toy body and the conducting parts of the battery circuit, an electric light bulb mounted on the toy body and having one terminal grounded thereon, switch mechanism optionally movable to one of three positions for providing bright, dim, or no illumination from the bulb, said switch mechanism including a single piece of insulation having an optionally movable element attached thereto and supporting spaced metallic contacts connected by a small resistor and adapted in coordination with the optionally movable element of the switch mechanism to permit current flow through one or both of said spaced metallic contacts or through neither, one or both of said contacts being in electrical connection with one terminal of the battery and said electric light bulb, while current is being supplied to the latter to permit either the entire available current from said battery or only a portion thereof to reach said bulb depending upon whether the switch mechanism is positioned for bright or for dim illumination of the bulb, and means electrically connecting the battery, the toy body, the switch mechanism and the bulb in series.

7. An electrically operated toy vehicle comprising a metallic toy body, a battery holder and battery, the battery save for its terminals being insulated from the metallic toy body and the conducting parts of the battery circuit, an electric light bulb mounted on the toy body and having one terminal grounded thereon, switch mechanism in part constituted of a conducting lever optionally movable to one of three positions for providing bright, dim, or no illumination from the bulb, said switch mechanism including in part also a single piece of insulation supporting spaced metallic contacts supported in said insulation and connected by a small resistor and adapted in coordination with the movement of the lever to permit current flow through one or both of said spaced metallic contacts or through neither, one or both of said contacts being in electrical connection with one terminal of the battery, and means electrically connecting the battery and said electric light bulb, while current is being supplied to the latter, to permit either the entire available current from said battery or only a portion thereof to reach said bulb depending upon whether the conducting lever is positioned for bright or for dim illumination of the bulb, the toy body, the switch mechanism and the bulb in series.

8. In a toy vehicle, an apertured chassis member, an electric light bulb mounted on said chassis, a battery-holding bracket mounted on said chassis and positioned in the aperture thereof, a battery supported by said bracket, switch mechanism selectively operable to produce bright, dim or no illumination from said bulb, said switch mechanism comprising a thin insulating member secured to one end of said bracket, spaced metallic contacts anchored in said member, a current-consuming unit connecting said contacts, means optionally movable to permit current to flow through one or both of said spaced contacts thereby supplying either the entire or a portion of the current available from said battery to said electric light bulb, and means electrically connecting said switch and said battery in series with said bulb.

9. In a toy vehicle, a supporting bracket having an aperture therein, a lamp socket comprising an annular threaded shell supported at one end in said aperture and adapted to receive the threaded base of an electric light bulb, an outwardly extending shoulder formed on the supported end portion of said annular shell and overlying a portion of the inner face of said bracket, the said end of said shell being crimped against the outer face of said bracket and cooperating with said shoulder to rigidly clamp the supported end of said annular shell to said bracket, a cap mounted on the unsupported end of said annular shell and provided with threads which screw on the outer periphery of said annular shell whereby the length of the lamp socket may be adjusted to accommodate bulbs having bases of different lengths, an insulating washer removably positioned in said cap, the diameter of said washer being slightly greater than the inner diameter of said annular shell so that when the bulb is not in position said washer is retained in said cap by the unsupported end of said annular screw shell, a central contact terminal on said washer for engaging the center terminal of the light bulb, the end of said cap being provided with a central aperture of sufficient size to prevent the central contact on said washer from coming into contact therewith when said washer is held up against the inner face of the end of said cap by the inserted bulb.

CLIFFORD G. HERBST.